United States Patent
Grissom et al.

(10) Patent No.: US 12,313,187 B2
(45) Date of Patent: May 27, 2025

(54) REINFORCED ROTARY VALVE SEAL ASSEMBLY

(71) Applicant: Hanon Systems, Daejeon (KR)

(72) Inventors: Emma Michelle Grissom, Howell, MI (US); Jichul Lee, Sterling Heights, MI (US); Edward William Sanders, III, Monroe, MI (US); Jason Dale Perkins, Dexter, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/461,851

(22) Filed: Sep. 6, 2023

(65) Prior Publication Data

US 2025/0075805 A1 Mar. 6, 2025

(51) Int. Cl.

| | |
|---|---|
| *F16K 5/04* | (2006.01) |
| *F16K 5/06* | (2006.01) |
| *F16K 11/085* | (2006.01) |
| *F16K 27/06* | (2006.01) |
| *F16K 31/04* | (2006.01) |

(52) U.S. Cl.
CPC .......... *F16K 5/0471* (2013.01); *F16K 5/0678* (2013.01); *F16K 5/0689* (2013.01); *F16K 11/0853* (2013.01); *F16K 27/065* (2013.01); *F16K 31/041* (2013.01)

(58) Field of Classification Search
CPC .... F16K 5/0471; F16K 5/0678; F16K 5/0689; F16K 11/0853; F16K 5/0271; F16K 11/083; F16K 11/0833; F16K 11/085; F16K 11/0873; F16K 11/0876; F16K 27/065; F16K 31/041

USPC .................................................. 251/309–312
See application file for complete search history.

(56) References Cited

U.S. PATENT DOCUMENTS

| | | | | |
|---|---|---|---|---|
| 3,211,421 A | * | 10/1965 | Johnson, Jr. | F16K 5/0678 |
| | | | | 251/315.08 |
| 3,397,861 A | * | 8/1968 | Scaramucci | F16K 5/0673 |
| | | | | 277/369 |

(Continued)

FOREIGN PATENT DOCUMENTS

| | | | |
|---|---|---|---|
| CN | 202469060 U | * | 10/2012 |
| DE | 202017000564 U1 | * | 4/2017 |

OTHER PUBLICATIONS

CN-202469060-U English translation (Year: 2012).*
DE-202017000564-U1 English Translation (Year: 2017).*

*Primary Examiner* — John Bastianelli
(74) *Attorney, Agent, or Firm* — Shumaker, Loop & Kendrick, LLP; James D. Miller

(57) ABSTRACT

A rotary valve includes a valve body including an opening formed therein, a rotary component received within the opening of the valve body with the rotary component configured to rotate relative to the valve body about an axis of rotation thereof, and a sealing assembly including a hard sealing structure and a soft sealing structure disposed between the valve body and the rotary component. The hard sealing structure is formed from a substantially rigid material and is configured to sealingly engage the rotary component. The hard sealing structure includes a support feature to reinforce the soft sealing structure. The soft sealing structure is formed from a resiliently deformable material and is configured to sealingly engage the hard sealing structure and the valve body.

20 Claims, 10 Drawing Sheets

(56) References Cited

U.S. PATENT DOCUMENTS

| | | | | |
|---|---|---|---|---|
| 3,425,661 | A * | 2/1969 | Mayo | F16K 5/14 |
| | | | | 251/283 |
| 3,610,575 | A * | 10/1971 | Yoneda | F16K 5/0673 |
| | | | | 251/315.08 |
| 4,572,515 | A | 2/1986 | Graqzioli | |
| 5,088,687 | A | 2/1992 | Stender | |
| 10,883,619 | B2 * | 1/2021 | Smith | F16K 27/065 |
| 11,280,414 | B2 | 3/2022 | Graichen | |
| 11,788,632 | B2 * | 10/2023 | Kuenzel | F16K 5/08 |
| | | | | 251/309 |
| 2010/0200791 | A1 | 8/2010 | Yung et al. | |
| 2021/0033200 | A1 * | 2/2021 | Seeger | F16K 5/0678 |
| 2021/0254717 | A1 | 8/2021 | Becker et al. | |
| 2022/0025976 | A1 | 1/2022 | Graichen | |

* cited by examiner

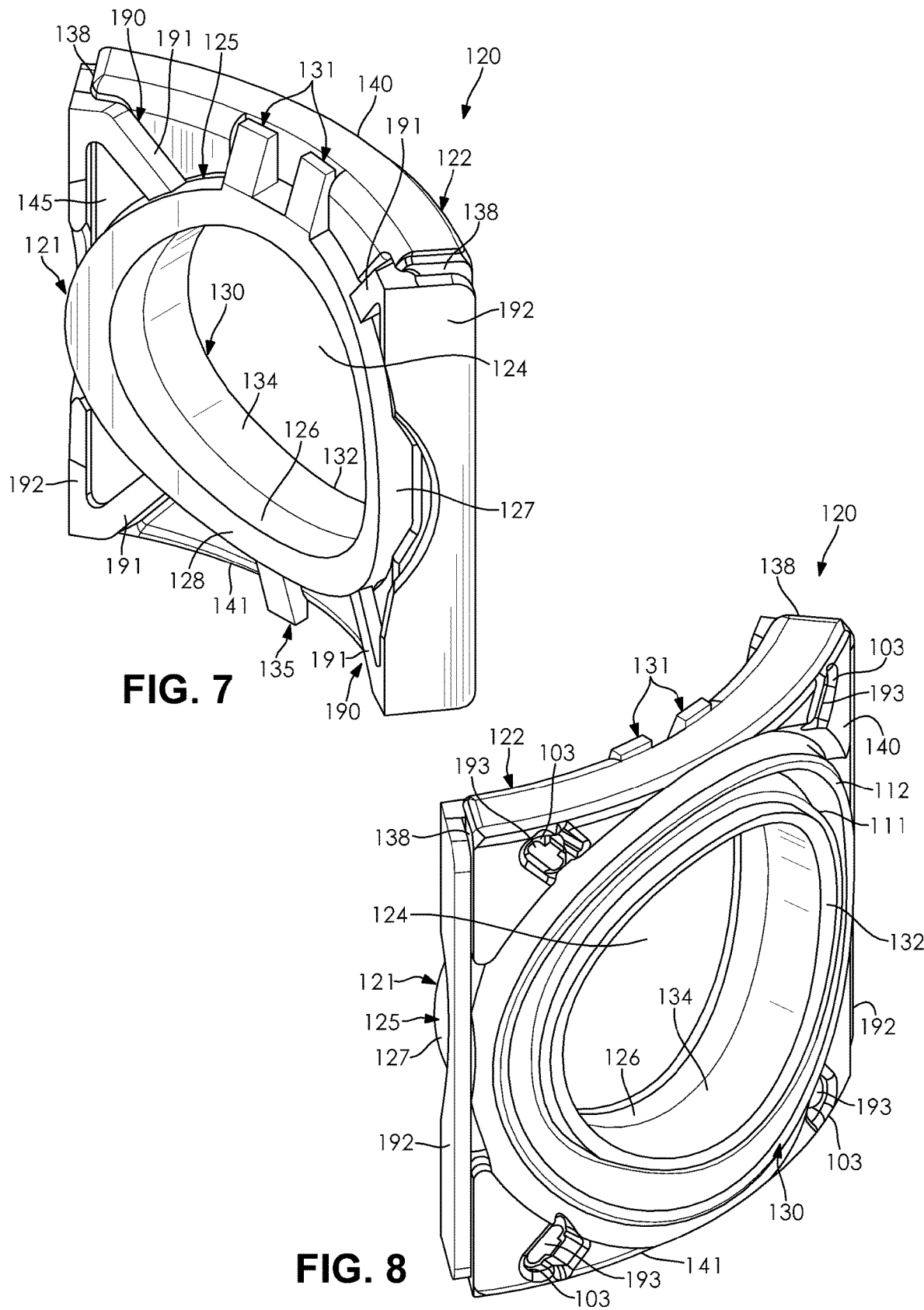

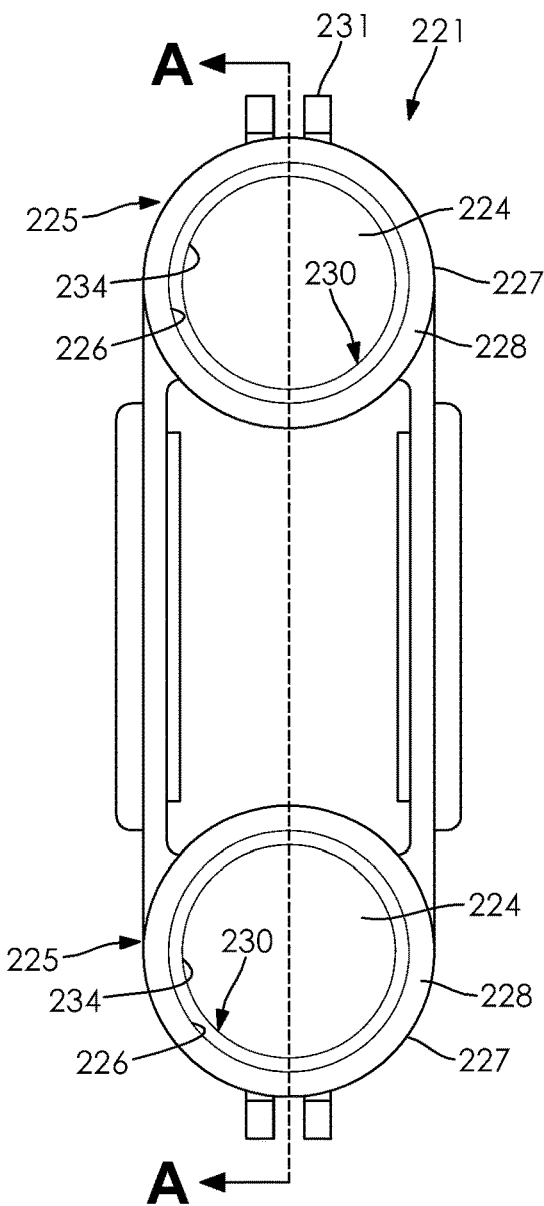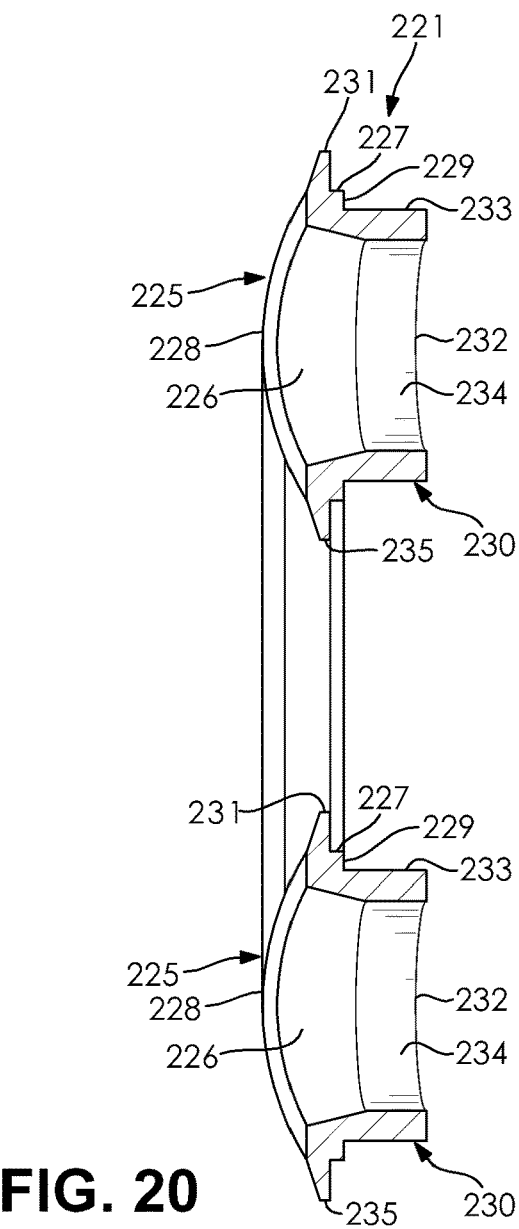
FIG. 19
FIG. 20

REINFORCED ROTARY VALVE SEAL ASSEMBLY

FIELD

The present disclosure relates to a seal assembly for a rotary valve, and more particularly, a reinforced seal assembly including each of a soft seal and a hard seal for ensuring a relatively low friction and fluid-tight seal between an inner surface of a stationary valve body and an outer surface of a rotary component.

BACKGROUND

A plug valve typically includes a "plug" having a substantially cylindrical or conical outer surface that is received within a valve body having a corresponding cylindrical or conical inner surface. The plug typically includes at least one passageway formed therethrough with at least one of the ends of each of the passageways intersecting the outer surface of the plug. Each of the passageways is configured to communicate a fluid through the plug with respect to any of a variety of different flow configurations. The valve body in turn typically includes one or more ports intersecting the inner surface of the valve body in order to communicate the fluid between any combination of the ports of the valve body and the passageways of the plug. The plug is operatively connected to a rotary actuator configured to rotate the plug relative to the stationary valve body to cause a repositioning of each of the passageways relative to each of the stationary ports. Depending on the configuration of the plug and the valve body, such rotation of the plug relative to the valve body may switch which of the passageways are placed in fluid communication with the corresponding ports or may cease flow through at least one of the passageways by placing the at least one of the passageways in alignment with a portion of the inner surface of the valve body devoid of one of the ports.

The manner in which the plug rotates relative to the valve body requires that a suitable fluid-tight seal is established between the outer surface of the plug and the inner surface of the valve body to ensure that the corresponding fluid does not leak into a relatively small cylindrical or conical gap that may be present between the plug and valve body to allow for the ease of rotation of the plug relative to the valve body. Traditionally, such seals are established by placing a sealing element on the inner surface of the valve body around a periphery of each of the ports. Each of the sealing elements is typically formed from a relatively soft and resilient material capable of being compressed between the inner surface of the valve body and the outer surface of the plug to ensure that a suitable sealing effect is maintained regardless of the rotational position of the plug. The material may be an elastomeric material, for example.

Oftentimes, however, the sealing element becomes unstable at relatively high pressure differentials (e.g. greater than 50,000 Pa), which may lead to deformation of the sealing element. Any deformation of the sealing element may result in high internal leak (i.e., port-to-port) and usually does not recover after the relatively high pressure differential has been alleviated.

Accordingly, there exists a need in the art to produce a seal assembly that can provide a desired degree of sealing effect and improved performance by maintaining stability and averting deformation during various pressure differential conditions.

SUMMARY

In concordance and agreement with the presently described subject matter, a seal assembly that can provide a desired degree of sealing effect and improved performance by maintaining stability and averting deformation during various pressure differential conditions, has surprisingly been discovered.

In one embodiment, a sealing assembly for a rotary valve having a rotary component configured to rotate relative to a valve body, the sealing assembly comprises: a first scaling structure configured to sealingly engage the rotary component, the first sealing structure including an outwardly extending support feature, wherein the first sealing structure is formed from a substantially rigid material; and a second sealing structure configured to sealingly engage the first sealing structure and the valve body, the second sealing structure disposed adjacent the outwardly extending support feature of the first sealing structure, wherein the second sealing structure is formed from a resiliently deformable material.

In another embodiment, a rotary valve comprises: a valve body including an opening formed therein; a rotary component received within the opening of the valve body, the rotary component configured to rotate relative to the valve body about an axis of rotation thereof; a first scaling structure configured to sealingly engage the rotary component, the first sealing structure including an outwardly extending support feature, wherein the first sealing structure is formed from a substantially rigid material; and a second sealing structure configured to sealingly engage the first sealing structure and the valve body, the second sealing structure disposed adjacent the outwardly extending support feature of the first sealing structure, wherein the second sealing structure is formed from a resiliently deformable material.

As aspects of some embodiments, the substantially rigid material is a thermoplastic material.

As aspects of some embodiments, the thermoplastic material is one of polyphthalamide or polyphenylene sulfide.

As aspects of some embodiments, the resiliently deformable material is an elastomeric material.

As aspects of some embodiments, the elastomeric material is one of Santoprene® thermoplastic elastomer. ethylene propylene diene monomer (EPDM) rubber, Nylabond® thermoplastic elastomer, EPDM foam, silicone rubber, nitrile, or urethane.

As aspects of some embodiments, the substantially rigid material includes a lower co-efficient of friction than the resiliently deformable material.

As aspects of some embodiments, the second sealing structure includes an indentation formed therein configured to receive the first sealing structure, wherein a portion of the first sealing structure configured to sealingly engage the rotary component is disposed outside of the indentation.

As aspects of some embodiments, the second sealing structure includes at least two sealing lips configured to sealingly engage the valve body, wherein each of the at least two sealing lips extends peripherally around a flow opening formed through the second sealing structure.

As aspects of some embodiments, the outwardly extending support feature extends into the flow opening formed through the second sealing structure.

As aspects of some embodiments, the second sealing structure is configured to sealingly engage an inner circumferential surface of the valve body partially defining the opening therein, and wherein the first sealing structure is configured to sealingly engage an outer circumferential surface of the rotary component.

As aspects of some embodiments, the second sealing structure is configured to sealingly engage an outer circumferential surface of the outwardly extending support feature of the first sealing structure.

As aspects of some embodiments, the second sealing structure is configured to sealingly engage a radial outer surface of a peripheral portion of the first sealing structure.

As aspects of some embodiments, the first sealing structure includes a first flow opening formed therethrough and the second sealing structure includes a second flow opening formed therethrough, wherein the first flow opening and the second flow opening cooperate to provide fluid communication between a passageway formed through the rotary component and a fluid port formed through the valve body.

As aspects of some embodiments, the support feature of the first sealing structure has a radial thickness of 1 mm or less and/or an axial thickness of 5 mm or less.

As aspects of some embodiments, the first sealing structure includes a tapered piloting feature configured to aid in installing the rotary component into the opening of the valve body.

As aspects of some embodiments, the first sealing structure includes a retention feature formed opposite the piloting feature thereof, and wherein the retention feature is configured to be received within a retention indentation formed in the valve body.

As aspects of some embodiments, the second sealing structure is compressed between the first sealing structure and the valve body, wherein the second sealing structure applies a spring force to the first sealing structure in a direction towards the rotary component.

BRIEF DESCRIPTION OF THE DRAWINGS

The drawings described herein are for illustrative purposes only of selected embodiments and not all possible implementations, and are not intended to limit the scope of the present disclosure.

FIG. 7 is a front perspective view of a sealing assembly according to an embodiment of the present disclosure, wherein the sealing assembly includes a first or hard sealing structure and a second or soft sealing structure;

FIG. 8 is a rear perspective view of the sealing assembly of FIG. 7;

FIG. 19 is a front view of a first or hard sealing structure of a sealing assembly according to another embodiment of the present disclosure; and FIG. 20 is a cross-sectional view of the hard sealing structure of FIG. 19 taken along section line A-A of FIG. 19.

DETAILED DESCRIPTION

Figure 1:
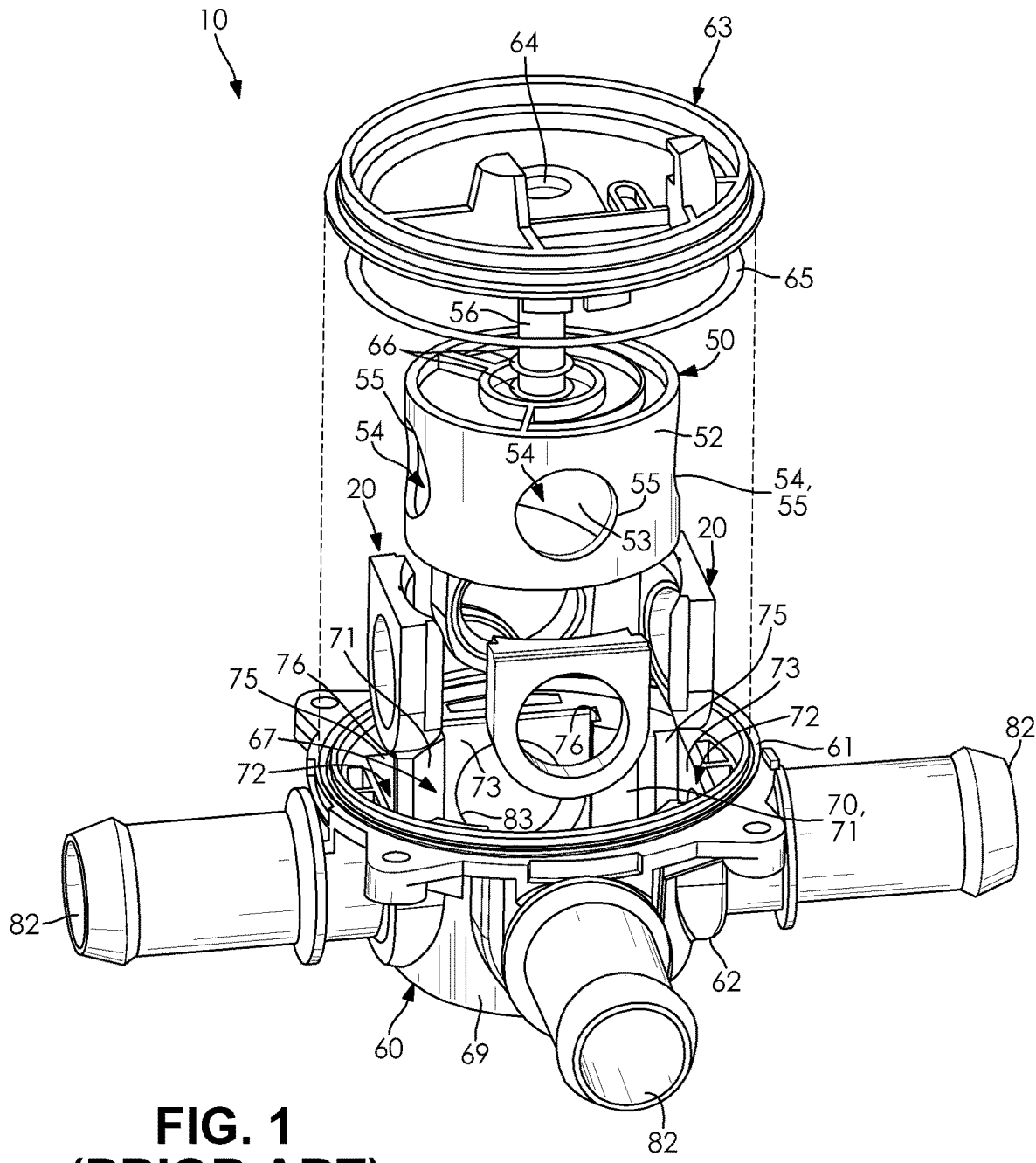
FIG. 1 is an exploded perspective view of a rotary valve utilizing a plurality of sealing assemblies according to the prior art.

The following description of technology is merely exemplary in nature of the subject matter, manufacture and use of one or more present disclosures, and is not intended to limit the scope, application, or uses of any specific present disclosure claimed in this application or in such other applications as may be filed claiming priority to this application, or patents issuing therefrom. Regarding methods disclosed, the order of the steps presented is exemplary in nature, and thus, the order of the steps may be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

FIGS. 1-6 illustrate a rotary valve 10 utilizing at least one seal assembly 20, as disclosed in U.S. Pat. No. 11,280,414, the entirety of which is incorporated herein by reference. The illustrated rotary valve 10 may alternatively be referred to as a "plug valve," as desired. The rotary valve 10 as shown and described herein may also be utilized for any number of different applications and for selectively conveying any variety of different fluids therethrough. The presently disclosed rotary valve 10 may be utilized in automotive applications, for example, including the control of various fluids associated with operation of a hydraulic system, a pneumatic system, a fuel system, or a heating, ventilating, and air conditioning (HVAC) system of the associated vehicle. The fluids suitable for use with the rotary valve 10 may be air, any hydraulic fluids, any types of fuel, any refrigerants, or any coolants typically utilized with respect to such vehicular systems, as desired. However, it should also be apparent that the present rotary valve 10 may be adapted for use with any fluid associated with any fluid conveying system without necessarily departing from the scope of the present disclosure.

The rotary valve 10 disclosed in FIGS. 1-6 generally includes a rotary component 50 (plug), a valve body 60, and at least one seal assembly 20 for providing a fluid-tight seal between the rotary component 50 and the valve body 60. The disclosed rotary valve 10 includes a substantially cylindrical rotary component 50 and a substantially cylindrical valve body 60. The rotary component 50 is configured to rotate relative to the valve body 60 about an axis of rotation thereof. The axis of rotation of the rotary component 50 extends through a center of the rotary component 50 and defines an axial direction thereof. The axis of rotation of the rotary component 50 also coincides with a central axis of the valve body 60 as well as the rotary valve 10 more generally, hence subsequent references to an axial direction of any of the rotary valve 10, the rotary component 50, or the valve body 60 refer to directions arranged parallel to the axis of rotation of the rotary component 50. Additionally, a radial direction of any one of the rotary valve 10, the rotary component 50, or the valve body 60 may refer to any of the directions passing through and arranged perpendicular to the axis of rotation of the rotary component 50.

The rotary component 50 illustrated in FIGS. 1-4 includes an outer circumferential surface 52 having a cylindrical shape. At least one passageway 54 is formed through the rotary component with at least one end 55 of at least one of the passageways 54 intersecting the outer circumferential surface 52 of the rotary component 50. Depending on the flow configuration of the rotary valve 10, each of the ends 55 of each of the passageways 54 may represent an inlet or an outlet into the corresponding passageway 54. In the provided embodiment, the rotary component 50 includes two of the passageways 54 with each of the opposing ends 55 of each of the two passageways 54 intersecting the outer circumferential surface 52 at positions circumferentially spaced from each other by 90 degrees. The rotary component 50 is shown as including a divider 53 separating the two different passageways 54 from each other to cause each of the ends 55 to be in fluid communication with an adjacent one of the ends 55 through an interior of the rotary component 50 while fluidly separated from the remaining two ends 55 of the other of the passageways 54. One skilled in the art should appreciate that alternative configurations of the passageways 54 may be utilized so long as the at least one of the ends 55 of one of the passageways 54 intersects the outer circumferential surface 52 of the rotary component 50 in a manner requiring the sealing thereof relative to the surrounding valve body 60. Alternative configurations of the passageways 54 may include at least one of the passageways 54 branching from one end 55 thereof to two or more separate ends 55 for establishing a 1-2, a 1-3, or a 2-3 (and so on) flow configuration through the rotary component 50. Additionally, in some configurations, one end 55 of at least one of the passageways 54 may intersect the outer circumferential surface 52 while at least one of the fluidly coupled ends 55 intersects an axial end surface of the rotary component 50 to cause the fluid to flow from a radial direction of the rotary component 50 to an axial direction of the rotary component 50 while turning 90 degrees. Such a configuration is illustrated with reference to the embodiment of the present disclosure shown in FIGS. 15 and 17, which is described in greater detail hereinafter.

In the embodiment shown in FIGS. 1-4, each of the ends 55 of each of the passageways 54 includes a substantially circular profile shape when viewed through a center of each of the ends 55 with respect to a corresponding radial direction of the rotary component 50. Additionally, each of the ends 55 may include a substantially arcuate or hyperbolic profile shape when viewed from a tangential direction of the rotary component 50 which is arranged perpendicular to the corresponding radial direction thereof. Each of the ends 55 further includes the profile shape of an arc of a circle when viewed from the axial direction of the rotary component 50. The arcuate shape and the shape of the arc of a circle are present due to the manner in which each of the ends 55 extends around the cylindrical shape of the outer circumferential surface 52. However, each of the ends 55 of each of the passageways 54 may include any profile shape from the radial and tangential directions while remaining within the scope of the present disclosure. For example, one of the ends 55 may instead include a square radial profile shape and a corresponding rectangular tangential profile shape, as one alternative and non-limiting example. As explained hereinafter, the configuration of each of the sealing assemblies 20 used to provide the fluid-tight seal around a periphery of each of the ends 55 of each of the passageways 54 may be adapted to the corresponding peripheral shape in order to fully surround each of the ends 55 for preventing a leakage of the corresponding fluid in any given direction around the periphery of each of the ends 55 of the passageways 54.

Figure 2:
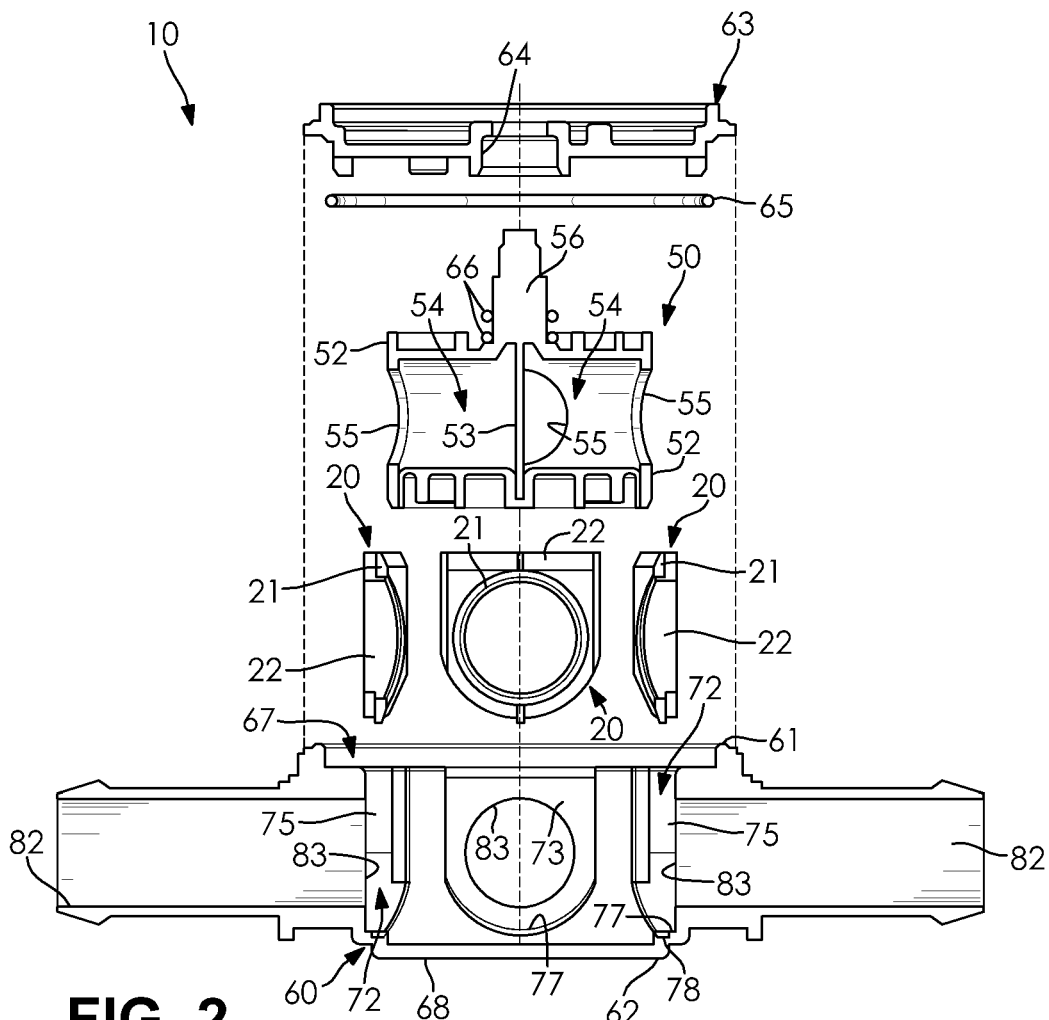
FIG. 2 is an exploded cross-sectional elevational view of the rotary valve of FIG. 1 taken through a plane parallel to an axis of rotation of a rotary component of the rotary valve.
Figure 3:
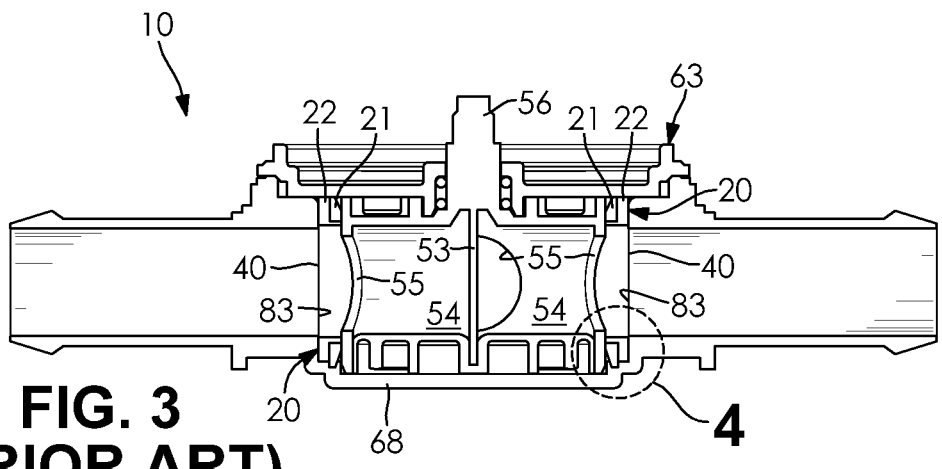
FIG. 3 is a cross-sectional elevational view of the rotary valve when fully assembled taken along the same plane as FIG. 2.

The rotary component 50 is operably coupled to a rotary motor or actuator (not shown) configured to provide a torque necessary to rotate the rotary component 50 about the axis of rotation thereof relative to the stationary valve body 60. The rotary motor or actuator may be a torque motor, a servo motor, an electric stepper motor, or a brushless DC motor, as non-limiting examples. Any rotary motor or actuator having the necessary torque and the preciseness for establishing a desired rotational position of the rotary component 50 relative to the valve body 60 may be selected without departing from the scope of the present disclosure. As shown in FIGS. 1-3, the rotary component 50 may include an axially extending stem 56 disposed along the axis of rotation thereof for operationally engaging the corresponding rotary motor of actuator.

The valve body 60 extends axially from a first end 61 to a second end 62 thereof. The first end 61 of the valve body 60 is configured to receive a cover 63 after the valve body 60 has axially received the rotary component 50 and each of the corresponding seal assemblies 20 therein, as explained in greater detail hereinafter. The cover 63 includes an opening 64 centered on the axis of rotation of the rotary component 50 with the opening 64 configured to receive the stem 56 of the rotary component 50 therethrough. An O-ring 65 is disposed between the first end 61 of the valve body 60 and an inner axial surface of the cover 63 to form a fluid-tight seal therebetween. Another pair of O-rings 66 is received between an inner circumferential surface of the cover 63 defining the opening 64 thereof and an outer circumferential surface of the stem 56 of the rotary component 50 to similarly form a fluid-tight seal therebetween, including during periods of rotation of the rotary component 50 relative to the valve body 60.

The valve body 60 includes a least one fluid port 82 for communicating a fluid to the rotary component 50, wherein each of the fluid ports 82 forms a hollow passageway through the valve body 60 through which the corresponding fluid may be conveyed towards or away from the rotary component 50. In the illustrated embodiment, the valve body 60 includes four of the fluid ports 82 spaced equally from each other with respect to a circumferential direction of the valve body 60 to cause each of the fluid ports 82 to point radially towards or away from the axis of rotation of the rotary component 50 in a direction circumferentially spaced 90 degrees from each of the adjacent fluid ports 82. The 90 degrees of circumferential displacement between the adjacent ones of the fluid ports 82 allows for each of the fluid ports 82 to correspond in position to each of the ends 55 of each of the passageways 54 formed through the rotary component 50 when the rotary component 50 is rotated to a desired operation position. However, it should be apparent to one skilled in the art that the valve body 60 may include as few as one radially extending fluid port 82 or any number of circumferentially spaced fluid ports 82 while remaining within the scope of the present disclosure, and especially in accordance with any variation to the configuration of the passageways 54 formed through the corresponding rotary component 50 from that shown in FIGS. 1-4.

The valve body 60 further includes an opening 67 formed therein with the opening 67 extending from the first end 61 of the valve body 60 towards the second end 62 thereof with respect to the axial direction. The opening 67 defines each of an axial end wall 68 and a circumferential wall 69 of the valve body 60. The axial end wall 68 is configured to engage an axial end of the rotary component 50 and the circumferential wall 69 is configured to surround the rotary component 50 when the rotary component 50 is rotatably received within the valve body 60 in the axial direction of the rotary valve 10.

The circumferential wall 69 of the valve body 60 includes an inner circumferential surface 70 extending peripherally around the rotary component 50 as defined by the opening 67. The inner circumferential surface 70 includes a plurality of cylindrical segments 71 and a plurality of pockets 72 interposed between adjacent ones of the cylindrical segments 71. When viewed from the axial direction of the valve body 60, each of the cylindrical segments 71 may include the shape of an arc of a circle having substantially the same radius of curvature as the circular profile shape of the outer circumferential surface 52 of the rotary component 50. As such, the outer circumferential surface 52 of the rotary component 50 substantially corresponds to the shape of each of the cylindrical segments 71 regardless of the instantaneous rotational position of the rotary component 50 relative to the valve body 60.

Each of the pockets 72 is indented in the radial outward direction of the rotary valve 10 into the circumferential wall 69 relative to each of the adjoining cylindrical segments 71. Each of the pockets 72 is shaped to receive one of the sealing assemblies 20 therein, and hence each of the pockets 72 corresponds to a position of one of the circumferentially spaced fluid ports 82 of the valve body 60 in need of sealing via one of the sealing assemblies 20.

In the provided embodiment, each of the pockets 72 includes a radial end surface 73 arranged parallel to a tangential direction of a radially aligned portion of the rotary component 50. The radial end surface 73 of each of the pockets 72 illustrated in FIGS. 1-4 is substantially planar in configuration, but it should be apparent to one skilled in the art that the radial end surface 73 may have any shape, including a cylindrical shape having a larger radius of curvature than the adjacent cylindrical segments 71, without necessarily departing from the scope of the present disclosure.

The radial end surface 73 of each of the pockets 72 intersects a radial innermost end 83 of a corresponding one of the fluid ports 82. As can be seen in FIGS. 1-3, the radial innermost end 83 of each of the fluid ports 82 may include a size and profile shape substantially corresponding to the size and profile shape of each of the ends 55 of the passageways 54 intersecting the outer circumferential surface 52 of the rotary component 50. The similar sizes and shapes of the radial innermost end 83 of each of the fluid ports 82 and the corresponding radial outermost end 55 of each of the passageways 54 may be selected to prevent a substantial change in pressure of the fluid communicated through the rotary valve 10 as could occur if substantial changes in direction or substantial changes in flow area were to be present therebetween. In the present embodiment, the radial innermost end 83 of each of the fluid ports 82 includes a circular profile shape to match the circular profile shape of each of the ends 55 of the passageways 54 intersecting the outer circumferential surface 52 of the rotary component 50.

Each of the pockets 72 further includes a pair of opposing lateral surfaces 75 arranged perpendicular to the corresponding radial end surface 73 and extending in the axial direction of the valve body 60. A radial innermost end of each of the lateral surfaces 75 includes a retaining shoulder 76 adjacent one of the adjoining cylindrical segments 71 with each of the retaining shoulders 76 extending in the axial direction of the valve body 60. The retaining shoulders 76 of each of the pockets 72 are configured to aid in maintaining a radial and circumferential position of the corresponding one of the sealing assemblies 20 when received within the corresponding pocket 72.

Each of the pockets 72 further includes an axial end surface 77 arranged perpendicular to the corresponding radial end surface 73 and connecting the corresponding lateral surfaces 75. In the provided embodiment, each of the radial end surfaces 73 includes a semi-cylindrical shape having a larger radius of curvature than the radial innermost end 83 of the corresponding fluid port 72 to space the axial end surface 77 from the corresponding end 83.

Figure 4:
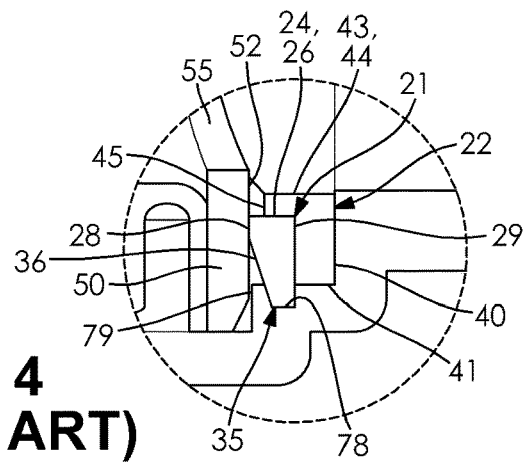
FIG. 4 is an enlarged fragmentary cross-sectional elevational view of the encircled portion of FIG. 3.
Figure 5:
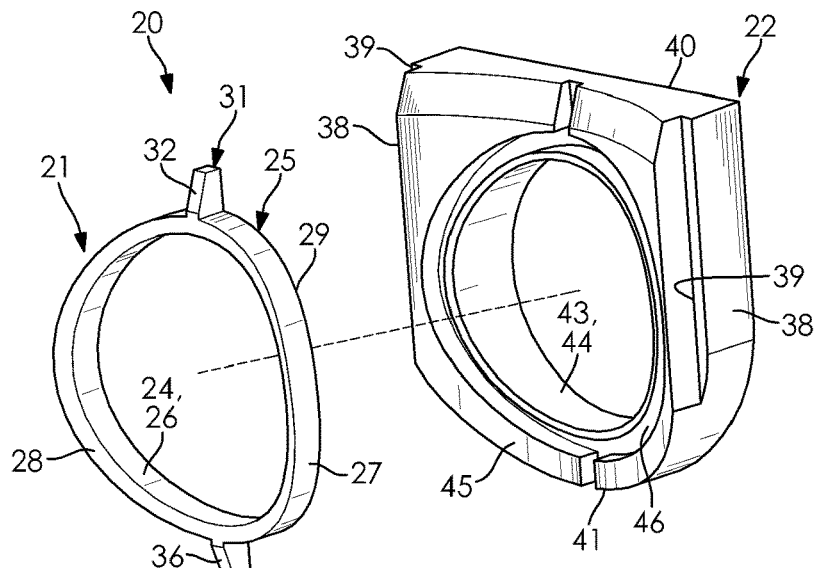
FIG. 5 is an exploded perspective view of one of the sealing assemblies of FIG. 1.
Figure 6:
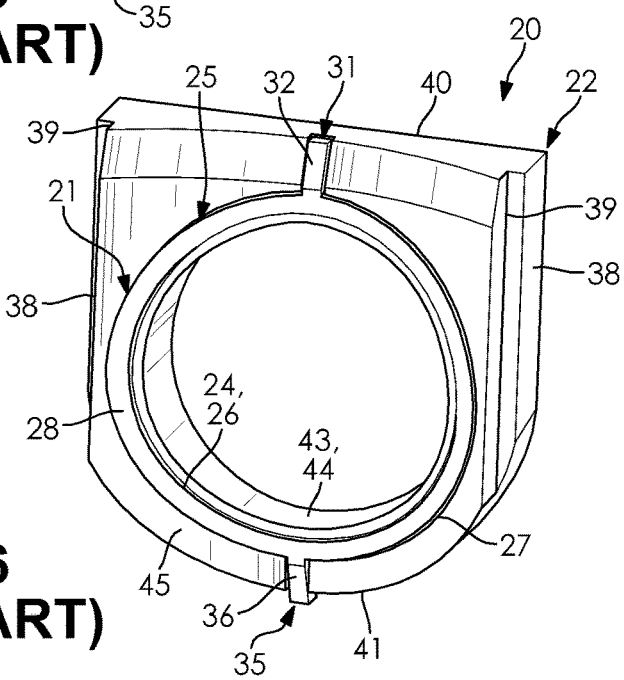
FIG. 6 is a perspective view of the sealing assembly of FIG. 5 shown fully assembled.
Figure 9:
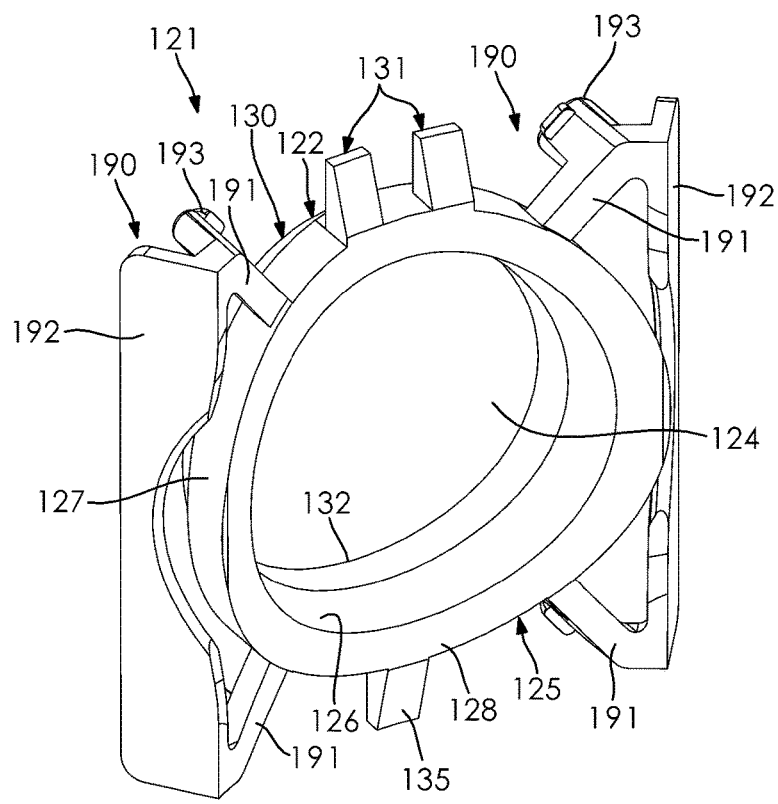
FIG. 9 is a front perspective view of the hard sealing structure of the sealing assembly of FIGS. 7 and 8.

As best shown in FIGS. 2-4, each of the axial end surfaces 77 includes a retention indentation 78 formed therein. Each of the retention indentations 78 is indented axially towards the second end 62 of the valve body 60 relative to the surrounding portions of the corresponding axial end surface 77 while being spaced at a position radially outwardly from the outer circumferential surface 52 of the rotary component 50. Each of the retention indentations 78 defines a retention lip 79 disposed immediately adjacent the outer circumferential surface 52 of the rotary component 50. Each of the retention lips 79 is configured to retain a portion of the corresponding sealing assembly 20 during assembly of the rotary valve 10 as described in greater detail hereinafter.

Figure 15:
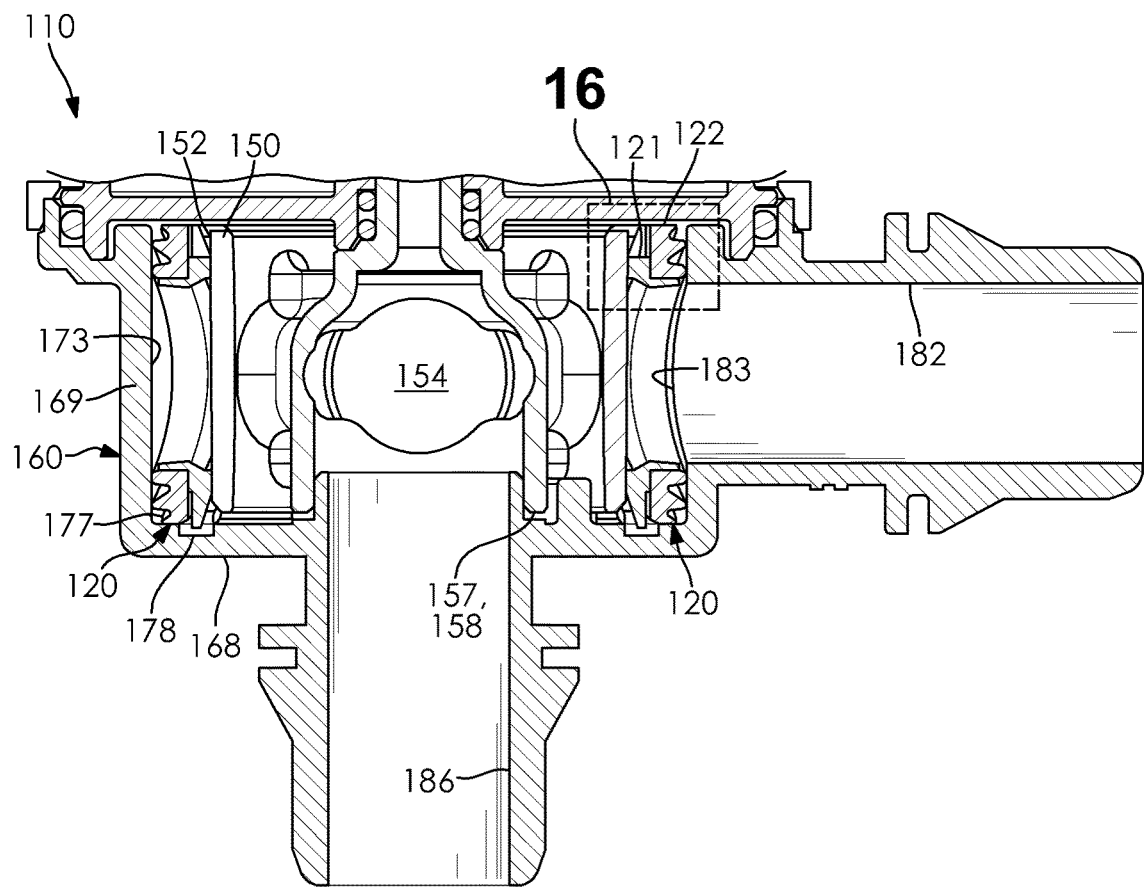
FIG. 15 is a cross-sectional view of a rotary valve according to an embodiment of the present disclosure as taken along a plane parallel to an axis of rotation of a rotary component of the rotary valve.
Figure 16:
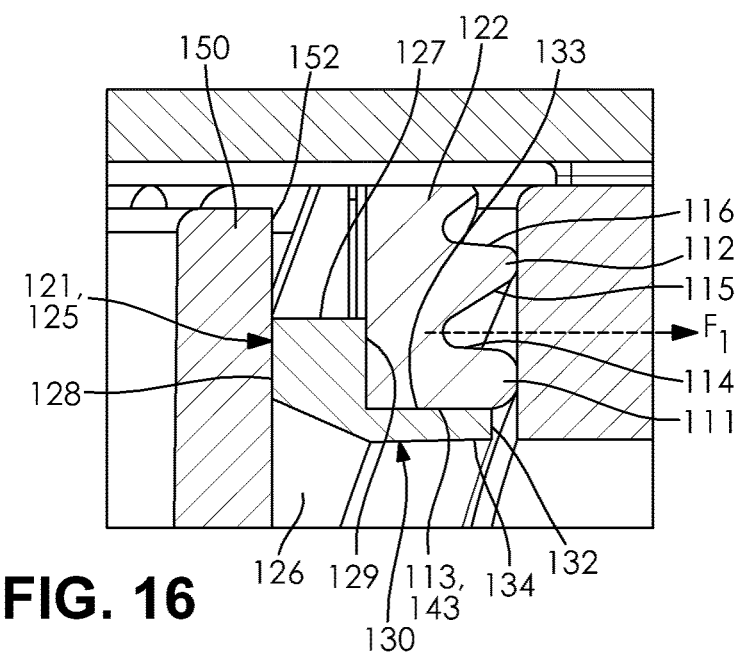
FIG. 16 is an enlarged fragmentary cross-sectional view of the boxed portion of FIG. 15.
Figure 17:
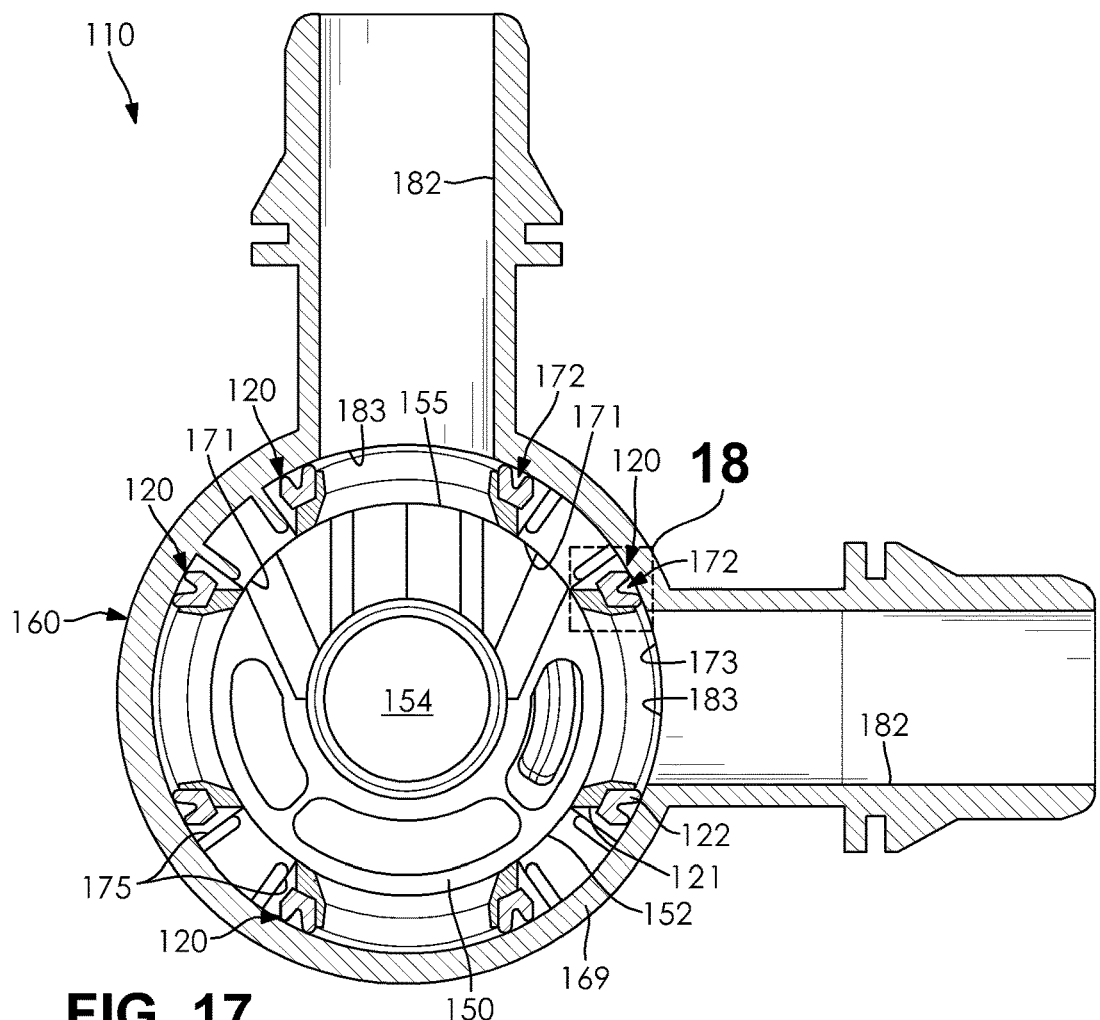
FIG. 17 is a cross-sectional view of the rotary valve of FIG. 15 as taken along a plane perpendicular to the axis of rotation of the rotary component.

Referring now to FIGS. 7-18, a sealing assembly 120 for use in a rotary valve 110 according to an embodiment of the present disclosure is shown and described. As best seen in FIGS. 15 and 17, the rotary valve 110 once again generally includes a rotary component 150, a valve body 160, and a plurality of sealing assemblies 120 for providing a fluid-tight seal between the rotary component 150 and the valve body 160 at circumferentially spaced positions around the rotary component 150. As is evident from review of FIGS. 15 and 17, the rotary valve 110 may include a substantially different flow configuration from the rotary valve 10 of FIGS. 1-4. Specifically, the valve body 160 of the rotary valve 110 includes a circumferential wall 169 having only two radially extending fluid ports 182 rather than the four radially extending fluid ports 82 shown with respect to the rotary valve 10. Each of the radially extending fluid ports 182 includes a radial innermost end intersecting an inner circumferential surface of the circumferential wall 169. The inner circumferential surface is divided into a plurality of cylindrical segments 171 and a plurality of pockets 172 interposed between adjacent ones of the cylindrical segments 171. Each of the pockets 172 differs from the pockets 72 of the valve body 10 in that a radial end surface 173 of each of the pockets 172 has a cylindrical curvature and shape with a radius of curvature thereof measured from an axis of rotation of the rotary valve 110. Each of the pockets 172 further includes a pair of opposing lateral surfaces 175 arranged in corresponding radial directions of the rotary valve 110. The radial end surface 173 and each of the lateral surfaces 175 of each of the pockets 172 is arranged to extend in the axial direction of the rotary valve 110. An axial end surface 177 of each of the pockets 172 is arranged perpendicular to the axial direction of the rotary valve 110 rather than including a semi-cylindrical shape as is disclosed with respect to the axial end surfaces 77 present in the rotary valve 10. The axial end surface 177 of each of the pockets 172 may further include a retention indentation 178 formed therein and extending in the axial direction into the valve body 160.

An end wall 168 of the valve body 160 may include an axially extending fluid port 186 arranged along the central axis of the rotary valve 110 as defined by an axis of rotation of the rotary component 150. The rotary component 150 may include a single passageway 154 formed therethrough with one of the ends 155 of the passageway 154 intersecting an outer circumferential wall 152 of the rotary component 150 and an opposing end 157 of the passageway 154 terminating at an axial end 158 of the rotary component 150 in alignment with the axially extending fluid port 186. The rotary valve 110 is accordingly configured to allow for a 90 degree turn of the fluid passing therethrough with the rotary component 150 switchable between the two different radially extending fluid ports 182 in fluid communication with the axially extending fluid port 186. The rotary component 150 is once again operably coupled to a suitable rotary motor or actuator (not shown) capable of rotating the rotary component 150 between the two different rotational positions.

Referring to FIGS. 7-8, one of the sealing assemblies 120 suitable for use with the rotary valve 110 is disclosed in isolation. The sealing assembly 120 includes a first sealing structure 121 and a second sealing structure 122. The first sealing structure 121 may alternatively be referred to as the "hard" sealing structure 121 while the second sealing structure 122 may alternatively be referred to as the "soft" sealing structure 122, as desired. The hard sealing structure 121 is configured to directly engage the outer circumferential surface 152 of the rotary component 150 to provide a fluid-tight seal therebetween when the rotary component 150 is rotated to any of the different prescribed positions thereof for causing any of the prescribed flow configurations through the rotary valve 110.

The hard sealing structure 121 is formed from a substantially rigid material such as a relatively rigid and relatively hard thermoplastic material. More specifically, the selected material may desirably be a semi-crystalline thermoplastic. If a thermoplastic material is utilized, the thermoplastic material may preferably be polyphthalamide (PPA) or polyphenylene sulfide (PPS). It may be preferable to utilize either of PPA or PPS due to each of the materials having a relatively strong chemical resistance, heat resistance, and resistance to permanent deformation or abrasion. Additionally, each of PPA and PPS can be provided as thermoplastic resins that are capable of being injection molded for forming the above described shape and configuration of the hard sealing structure 121 using a relatively inexpensive manufacturing process while remaining within the desired tolerances for establishing the desired sealing engagement with the outer circumferential surface 152 of the rotary component 150. Other rigid thermoplastic materials may be utilized for forming the hard sealing structure 121, such as polytetrafluoroethylene (PTFE), although PTFE is incapable of being manufactured using an injection molding process, hence a more expensive and difficult manufacturing process is required to properly form the hard sealing structure 121 to the desired configuration for providing the fluid-tight seal with the outer circumferential surface 152 of the rotary component 150. Additional rigid materials may also be utilized for forming the hard sealing structure 121 as well, including various metals, various ceramics, carbon graphite, and even glass, depending on the application specific requirements for the associated rotary valve 110.

In some embodiments, the rotary component 150, and specifically the portion of the rotary component 150 forming the outer circumferential surface 152 thereof, may be formed from the same materials described as being suitable for forming the hard sealing structure 121. For example, the rotary component 150 may be formed from a rigid thermoplastic material such as PPA or PPS, as non-limiting examples. In some embodiments, the same material may be selected to form each of the rotary component 150 and the hard sealing structure 121. However, any rigid material may be selected to form the rotary component 150 without necessarily departing from the scope of the present disclosure.

The hard sealing structure 121 may require a limited degree of compliancy to allow the hard sealing structure 121 to conform to any surface irregularities or dimensional inconsistencies present in the rotary component 150 to ensure that the desired sealing effect is present regardless of the rotational position of the rotary component 150. The rigidity of the preferred thermoplastic materials such as PPA or PPS may require the hard sealing structure 121 to be formed with a minimal cross-section around the circumference of the peripheral portion 125 to ensure the desired degree of compliance and conformity. The peripheral portion 125 of the hard sealing structure 121 may be provided to include a radial thickness of 3 mm or less and an axial thickness of 3 mm or less to ensure the desired degree of compliance and conformity thereof. For example, the peripheral portion 125 may be provided with a radial thickness of about 2 mm and an axial thickness of about 2 mm.

As more clearly shown in FIGS. 9-12, the peripheral portion 125 may include an inner circumferential surface 126, an opposing outer circumferential surface 127, a radial inner surface 128 configured to engage the outer circumferential surface 152 of the rotary component 150, and a radial outer surface 129 opposing the radial inner surface 128 and configured to engage the soft sealing structure 122. In certain embodiments, the hard sealing structure 121 further includes a support feature 130. The support feature 130 may be formed integral with the peripheral portion 125, as depicted in FIGS. 7-12 and 15-18, or as a separate and distinct component. The support feature 130 may extend outwardly from the peripheral portion 125 away from the outer circumferential surface 127. The support feature 130 may include a radial outer circumferential surface 132, an outer circumferential surface 133, and an opposing inner circumferential surface 134. In some instances, the support feature 130 may extend axially outwardly from the peripheral portion 125. The support feature 130 of the present disclosure is configured to reinforce and support the soft sealing structure 122. Advantageously, the support feature 130 militates against the soft sealing structure 122 from becoming unstable at relatively high pressure differentials (e.g. greater than 50,000 Pa), which may lead to deformation of the soft sealing structure 122. As such, any deformation of the soft sealing structure 122 that would have resulted in a high internal leak (i.e., port-to-port) is prevented. Hence, the support feature 130 of the hard sealing structure 121 provides a desired degree of sealing effect and improved performance by maintaining stability and averting deformation during various pressure differential conditions of the valve 110.

In certain embodiments, the support feature 130 of the hard sealing structure 121 may be provided to include a radial thickness of 1 mm or less and an axial thickness of 5 mm or less to ensure the desired degree of sealing effect and reinforcement to the soft sealing structure 122. For example, the support feature 122 may be provided with a radial thickness in a range of about. 7 mm to about 1 mm, preferably about 0.85 mm, and an axial thickness in a range of about 4 mm to about 5 mm, preferably in a range of about 4.6 mm to about 4.7 mm, and more preferably 4.65 mm. The support feature 130 may be formed substantially the same or similar rigid material as the peripheral portion 125 and/or the hard sealing structure 121.

The inner circumferential surfaces 126, 134 define a flow opening 124 through the hard sealing structure 121 substantially corresponding in size and shape to each of the radially extending fluid ports 182 formed through the valve body 160 as well as the radially extending end 155 of the passageway 154 formed through the rotary component 150. A radial direction of the rotary component 150 passing through a center of the flow opening 124 defines a central axis of the hard sealing structure 121, hence references to an axial direction of the hard sealing structure 121 hereinafter refer to directions parallel to the central axis thereof. Furthermore, references to a radial direction of the hard sealing structure 121 also refer to those directions passing through the central axis thereof and arranged perpendicular thereto.

The radial inner surface 128 is substantially similar to the radial inner surface 28 of the hard sealing structure 21 and includes a curved cylindrical shape complimentary to the cylindrical shape of the outer circumferential surface 152 of the rotary component 150. The outer circumferential surface 127 extends in the axial direction of the hard sealing structure 121 and is also substantially similar to the outer circumferential surface 27 of the hard sealing structure 21. However, the inner circumferential surface 126 and the radial outer surface 129 of the hard sealing structure 121 differ from the corresponding surfaces 26, 29 of the hard sealing structure 21 as a result of a reducing radial thickness of the peripheral portion 125 as the peripheral portion 125 extends in a radial outward direction of the rotary valve 110 coinciding with the axial direction of the hard sealing structure 121. More specifically, at least a portion of the inner circumferential surface 126 is tapered towards the radial outer surface 129 to cause the radial outer surface 129 to include a reduced radial thickness relative to the radial inner surface 128. The radial outer surface 129 of the peripheral portion 125 accordingly includes a smaller surface area than the radial inner surface 128 thereof.

The hard sealing structure 121 includes a pair of laterally spaced apart piloting features 131 and a retention feature 135 projecting from diametrically opposing sides of the peripheral portion 125 with respect to the axial direction of the rotary valve 110. Other than being spaced apart and provided as a pair, each of the piloting features 131 is similar in structure and purpose to the piloting feature 31 of the hard sealing structure 21, hence further description thereof is omitted. Similarly, the retention feature 135 is similar in structure and purpose to the retention feature 35 of the hard sealing structure 21, hence further description thereof is also omitted.

Figure 10:
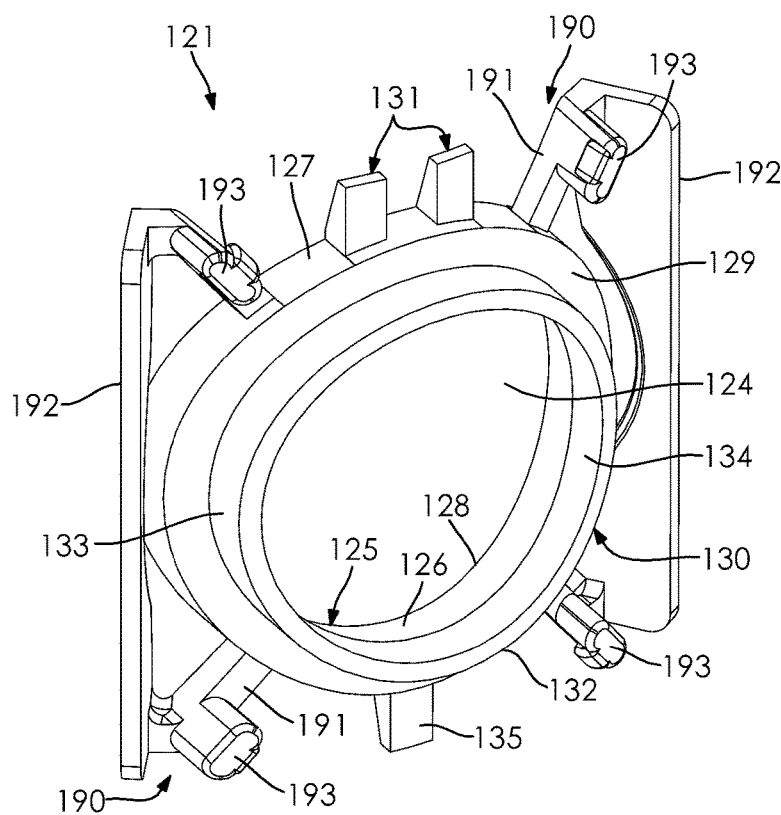
FIG. 10 is a rear perspective view of the hard sealing structure of the sealing assembly of FIGS. 7 and 8.
Figure 11:
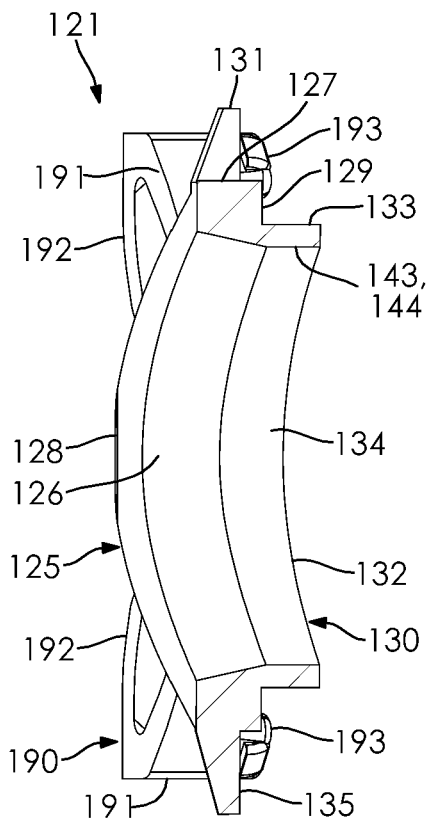
FIG. 11 is a cross-sectional view of the hard sealing structure of the sealing assembly of FIGS. 7 and 8 as taken through a first plane passing through opposing sides of the hard sealing structure.
Figure 12:
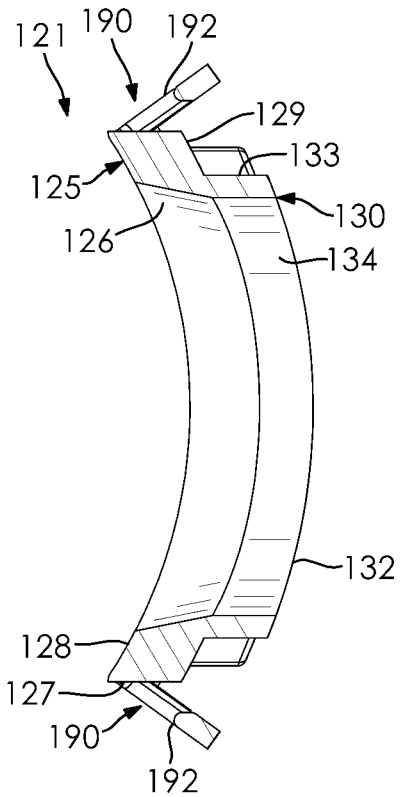
FIG. 12 is a cross-sectional view of the hard sealing structure of the sealing assembly of FIGS. 7 and 8 as taken through a second plane arranged perpendicular to the first plane of FIG. 11.
Figure 13:
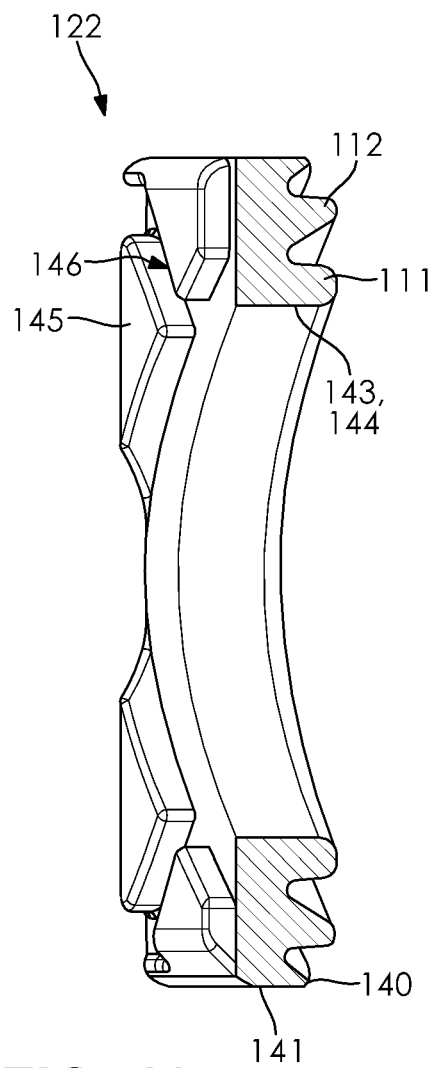
FIG. 13 is a cross-sectional view of the soft sealing structure of the sealing assembly of FIGS. 7 and 8 as taken through a first plane passing through opposing sides of the soft sealing structure.
Figure 14:
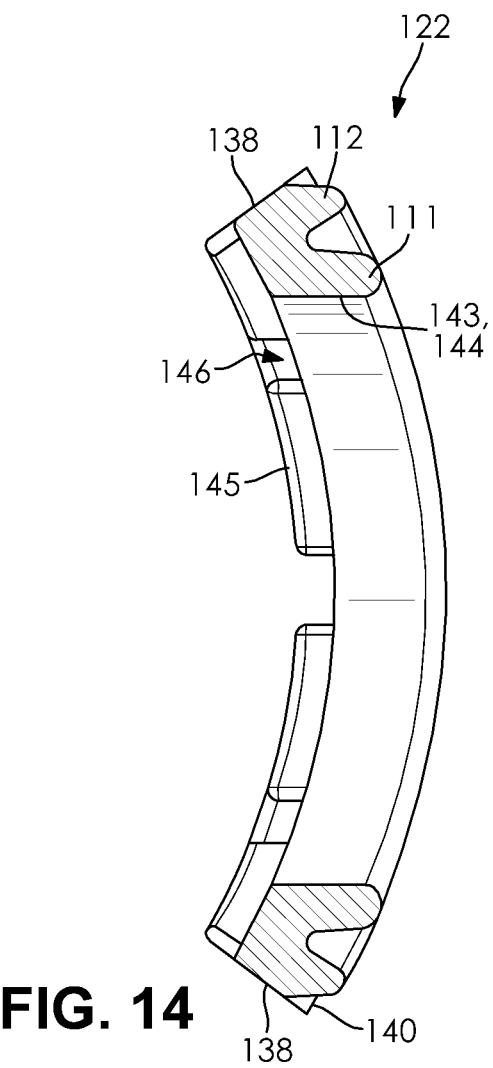
FIG. 14 is a cross-sectional view of the soft sealing structure of the sealing assembly of FIGS. 7 and 8 as taken through a second plane arranged perpendicular to the first plane of FIG. 13.

The hard sealing structure 121 further includes a pair of lateral frame members 190 extending from opposing lateral sides of the peripheral portion 125. Each of the frame members 190 includes a pair of connecting portions 191 extending at least partially radially outwardly from the outer circumferential surface 127 of the peripheral portion 125 with respect to the radial direction of the hard sealing structure 121. Each of the pairs of the connecting portions 191 connects the peripheral portion 125 to a corresponding lateral wall 192 of one of the frame members 190. Each of the lateral walls 192 project away from the corresponding pair of the connecting portions 191 in a direction corresponding to a radial direction of the rotary valve 110 when the sealing assembly 120 is received within the valve body 160 as described hereinafter. As best seen in FIG. 10, each of the connecting portions 191 further includes a coupling projection 193 extending therefrom in either of the axial direction of the hard sealing structure 121 of a direction corresponding to a radial outward direction of the rotary valve 110 when the sealing assembly 120 is received within the valve body 160.

The soft sealing structure 122 serves substantially the same purpose as the soft sealing structure 22, but includes a different configuration to accommodate the changes in the structure of the valve body 160 and the hard sealing structure 121 from the valve body 60 and the hard sealing structure 21 as noted hereinabove. The soft sealing structure 122 may include an improved double-sealing surface for engaging the circumferential wall 169 if desired.

The soft sealing structure 122 has a shape substantially complimentary to that of each of the pockets 172 formed in the valve body 160. In the illustrated embodiment, the soft sealing structure 122 includes a pair of lateral surfaces 138 with each of the lateral surfaces 138 extending in the axial and radial directions of the valve body 110 when the soft sealing structure 122 is received within one of the pockets 172. The soft sealing structure 122 includes a radial outer surface 140 having a generally cylindrical shape with a radius of curvature greater than that of the outer circumferential surface 152 of the rotary component 150. The soft sealing structure 122 also includes a substantially planar axial end surface 141 arranged perpendicular to the axial direction of the rotary valve 110 and configured to engage the axial end surface 177 of the corresponding one of the pockets 172.

The soft sealing structure 122 includes a cylindrically shaped flow opening 144 formed therethrough as defined by an inner circumferential surface 143 thereof. As used hereinafter, a radial direction of the rotary valve 110 extending through the center of the flow opening 144 also represents a central axis of the soft sealing structure 122, hence references to the axial direction of the soft sealing structure 122 refer to those directions arranged parallel to the described central axis thereof. The flow opening 144 accordingly includes a circular profile shape when viewed in the axial direction of the soft sealing structure 122. The flow opening 144 formed through the soft sealing structure 122 is dimensioned to receive the support feature 130 therein and ensure that the radial outer surface 129 of the peripheral portion 125 hard sealing structure 121 bears against the soft sealing structure 122 when the sealing assembly 120 is placed in the operational position thereof. In some embodiments, the soft sealing structure 122 may be seated on and configured to sealingly engage the outer circumferential surface 133 of the support feature 130. The support feature 130 may prevent the soft sealing structure 122 from being deformed inwardly by higher pressures external to at least one of the fluid ports 182, 186. In certain instances, the support feature 130 may reduce a surface area of the soft sealing structure 122 that is exposed to fluid pressures inside the fluid ports 182, 186, thereby prevent deformation caused by pressure differentials and maintain sealing.

A radial inner surface 145 of the soft sealing structure 122 includes a cylindrical shape with a slightly larger radius of curvature than the radial inner surface 128 of the hard sealing structure 121. The radial inner surface 145 further includes an axial indentation 146 formed therein having a shape complimentary to a profile shape of the hard sealing structure 121 with respect to the axial direction thereof. The axial indentation 146 includes a depth in the axial direction of the soft sealing structure 122 that is less than the axial thickness of the hard sealing structure 121 to allow for the radial inner surface 128 of the hard sealing structure 121 to be disposed radially inwardly of the remainder of the radial inner surface 145 of the soft sealing structure 122 to ensure that the soft sealing structure 122 does not engage the outer circumferential surface 152 of the rotary component 150 when the sealing assembly 120 is disposed within the corresponding one of the pockets 172 of the valve body 160. The retention feature 135 extends outside of the axial indentation 146 with respect to the axial direction of the valve body 110 to ensure that the retention feature 135 is received within the retention indentation 178 formed in the valve body 160 at a position external to the soft sealing structure 122. The axial indentation 146 forms a locating feature of the soft sealing structure 122 for preventing undesired motion of the hard sealing structure 121 relative thereto.

As suggested by the given names, the hard sealing structure 121 is formed from a material that is harder and stiffer than the material selected for forming the soft sealing structure 122. More specifically, the soft sealing structure 122 is formed from a relatively soft material that is resiliently deformable. As used herein, a resiliently deformable material is a material that can be deformed in such a way that the material attempts to return to its original position following deformation thereof, and especially when the material is compressed to be reduced in dimension in a given direction. The resiliency of the material selected for the soft sealing structure 122 should be such that the material applies a radially inward spring force to the hard sealing structure 121 in response to the soft sealing structure 122 being compressed in the radial outward direction towards the circumferential wall 169, wherein the radial force and radial direction of compression refer to the radial direction of the rotary valve 110. The resiliently deformable material may preferably be an elastomeric material such as Santoprene® thermoplastic elastomer, ethylene propylene diene monomer (EPDM) rubber, Nylabond® thermoplastic elastomer, EPDM foam, silicone rubber, nitrile, or urethane, as non-limiting examples. The elastomeric material may be selected based on the type of fluid and operating characteristics of the fluid being communicated through the rotary valve 110, such as including a desired chemical resistance and heat resistance. In a preferred embodiment, the elastomeric material may be selected to be a low durometer, 35-45 shore A, soft seal rubber to provide a low spring force to displacement ratio with respect to the soft sealing structure 122. The use of the low durometer material also aids in addressing concerns relating to tolerance stack-up in any given direction, including the radial direction of the rotary valve 110, because of the low force to displacement ration allows for larger and more manufacturing friendly tolerances to be used in forming each of the seal assemblies 120.

The rigid material forming the hard sealing structure 121 may be selected to include a lower co-efficient of friction than the resilient and soft material selected for forming the soft sealing structure 122. As such, the rotation of the rotary component 150 via the corresponding rotary motor or actuator requires less torque to overcome the frictional forces present between the radial inner surface 128 of the hard sealing structure 121 and the outer circumferential surface 152 of the rotary component 150 than would be the case if the soft sealing structure 122 were placed in direct contact with the rotary component 150 during the rotation thereof.

A plurality of coupling openings 103 are formed in the radial inner surface 145 of the soft scaling structure 122 towards the radial outer surface 140 thereof. The coupling openings 103 are shown as extending through the soft sealing structure 122 in FIG. 8, but any depth of the coupling openings 103 may be utilized without necessarily departing from the scope of the present disclosure. Each of the coupling openings 103 may extend into the soft sealing structure 122 in either of the axial direction of the soft sealing structure 122 or a corresponding radial direction of the rotary valve 110, as desired. Each of the coupling openings 103 is positioned and dimensioned to receive a corresponding one of the coupling projections 193 therein when the hard sealing structure 121 is engaged with the soft sealing structure 122.

The radial outer surface 140 of the soft sealing structure 122 differs substantially from the corresponding radial outer surface 40 of the soft sealing structure 22 due to the inclusion of a pair of sealing lips 111, 112 projecting therefrom in the axial direction of the soft sealing structure 122 with each of the sealing lips 111, 112 configured to sealingly engage the radial end surface 173 of the corresponding one of the pockets 172. More specifically, a first sealing lip 111 is disposed immediately adjacent the flow opening 144 through the soft sealing structure 122 while a second sealing lip 112 is disposed radially outwardly of the first sealing lip 111 with respect to the radial direction of the soft sealing structure 122. Each of the sealing lips 111, 112 may include a substantially arcuate tip for engaging the corresponding radial end surface 173, but other shapes may also be used without departing from the scope of the present disclosure. Each of the sealing lips 111, 112 extend annularly around the flow opening 144 for forming two radially spaced apart sealing surfaces around the flow opening 144, thereby providing for an additional and independently provided sealing surface for preventing leakage between the radial innermost end 183 of the corresponding fluid port 182 and the radial outer surface 140 of the soft sealing structure 122. Each of the sealing lips 111, 112 includes a circular profile shape when viewed from the axial direction of the soft sealing structure 122, but alternative shapes may be utilized if the corresponding flow opening 144 is provided to include a different shape from that shown and described.

The first sealing lip 111 includes an inner circumferential surface 113 and an opposing outer circumferential surface 114 while the second sealing lip 112 also includes an inner circumferential surface 115 and an opposing outer circumferential surface 116. The inner circumferential surface 113 of the first sealing lip 111 may coincide with the inner circumferential surface 143 of the soft sealing structure 122 defining the flow opening 144 therethrough, hence the inner circumferential surface 113 may extend in the axial direction of the soft sealing structure 122.

Figure 18:
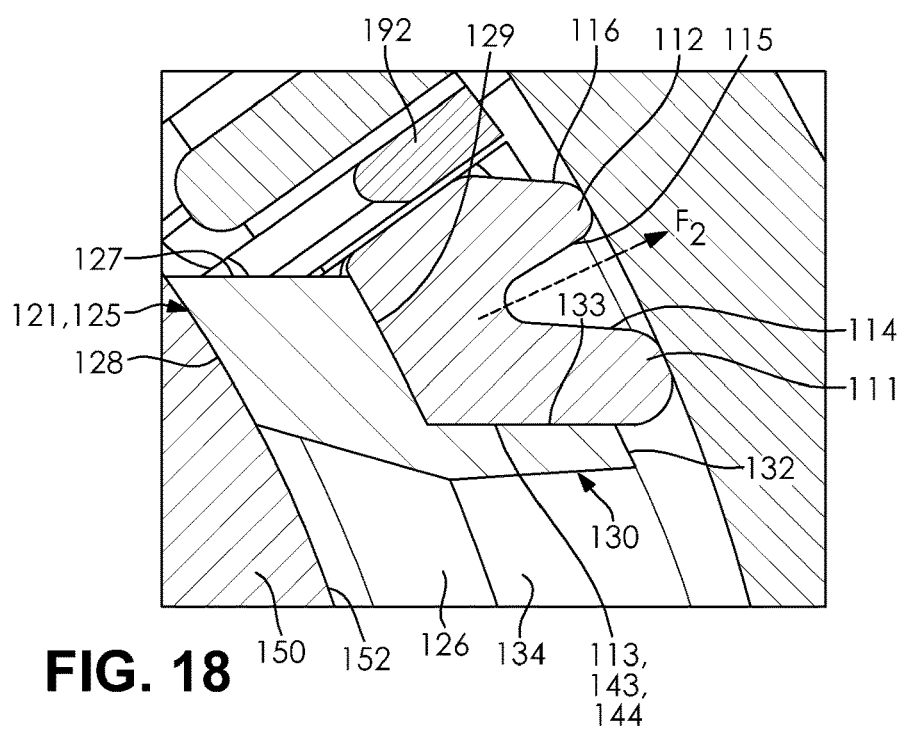
FIG. 18 is an enlarged fragmentary cross-sectional view of the boxed portion of FIG. 13.

Referring now to FIG. 16, a vector F1 is shown as extending between the outer circumferential surface 114 of the first sealing lip 111 and the inner circumferential surface 115 of the second sealing lip 112. FIG. 18 shows a vector F2 extending between the outer circumferential surface 114 of the first sealing lip 111 and the inner circumferential surface 115 of the second sealing lip 112 at a position rotationally spaced about 90 degrees from the position of the vector F1 with respect to the central axis of the soft sealing structure 122. Each of the vectors F1, F2 is arranged to extend in spaced apart radial directions of the rotary valve 110 extending from the axis of rotation of the rotary component 150 and arranged perpendicular thereto. Due to the manner in which the soft sealing structure 122 is compressed between the outer circumferential surface 152 of the rotary component 150 via the hard sealing structure 121 and the radial end surface 173 of the corresponding pocket 172, each of the vectors F1, F2 are representative of a direction of the compressive forces acting on the soft sealing structure 122 at the identified locations with each of the vectors F1, F2 arranged perpendicular to the outer circumferential surface 152 and the radial end surface 173 at the locations each of the vectors F1, F2 pass through.

As shown in FIG. 16, the outer circumferential surface 114 of the first sealing lip 111 is inclined away from the vector F1 at an angle of at least 1 degree while the inner circumferential surface 115 of the second sealing lip 112 is inclined away from the vector F1 at an opposing angle of at least 1 degree. Similarly, despite the spacing of the vector F2 from the vector F1 and the perpendicular arrangement of the given cross-section of FIG. 18 from that of FIG. 16, the outer circumferential surface 114 of the first sealing lip 111 is inclined away from the vector F2 at an angle of at least 1 degree while the inner circumferential surface 115 of the second sealing lip 112 is inclined away from the vector F2 at an opposing angle of at least 1 degree. The inclination of the circumferential surfaces 114, 115 away from each of the vectors F1, F2 beneficially prevents an undesired buckling of each of the sealing lips 111, 112 towards one another during the compression of the soft sealing structure 122, wherein such buckling could interrupt the sealing effect provided by each of the sealing lips 111, 112. As such, two distinct and fluid-tight annular sealing surfaces are formed by the soft sealing structure 122 around the corresponding flow opening 144 formed therethrough.

Each of the sealing assemblies 120 is assembled by placing the hard sealing structure 121 within the axial indentation 146 formed in the radial inner surface 145 of the soft sealing structure 122. The coupling projections 193 of the hard sealing structure 121 are also received within the coupling openings 103 of the soft sealing structure 122 while the lateral walls 192 of each of the frame members 190 extend around and engage the lateral surfaces 138 of the soft sealing structure 122. The various different engagements between the hard sealing structure 121 and the soft sealing structure 122 maintains the positions of the structures 121, 122 relative to one another. Each of the sealing assemblies 120 is then able to be received within one of the pockets 172 of the valve body 160 via insertion with respect to the axial direction of the valve body 160. In contrast to the first embodiment of the present disclosure, the lateral walls 192 associated with the hard sealing structure 121 are caused to engage the lateral surfaces 175 of the corresponding pocket 172 instead of the soft sealing structure 122. The rotary component 150 is once again axially received within the valve body 160 with the piloting features 131 performing a similar role in progressively compressing each of the soft sealing structures 122 for forming the desired radial forces between the rotary component 150, the hard sealing structure 121, the soft sealing structure 122, and the valve body 160.

Referring now to FIG. 19-20, a hard sealing structure 221 of a sealing assembly according to another embodiment of the present disclosure is disclosed. As is apparent from the illustrations thereof, a hard sealing structure 221 of the sealing assembly includes structures common to one or the other of the previously described hard sealing structures 21, 121, hence further description is largely omitted herein.

The hard sealing structure 221 differs from the previously described hard sealing structures 21, 121 primarily as a result of being intended for a valve having fluid ports in stacked relationship. The hard sealing structure 221 includes a pair of peripheral portions 225 and a corresponding pair of support features 230. The two peripheral portions 225 and corresponding support features 230 are coupled together by a web portion extending therebetween. As a result, a flow through multiple fluid ports may be controlled simultaneously by the sealing assembly including the hard sealing structure 221. Further, the sealing assembly including the hard sealing structure 221 utilizes much less material than other conventional seal assemblies, while also reducing the number of specific features that must be formed in the sealing structure 221 for meeting the sealing requirements of the associated rotary valve.

The novel features regarding the seal assemblies disclosed herein may also be readily adapted for use in any variety of related rotary valve configurations in addition to those shown and described herein. For example, although the seal assemblies shown and described herein are shown as being contoured for reception between a cylindrically shaped rotary component (plug) and a valve body having a cylindrically contoured inner surface, it should be understood that each of the seal assemblies disclosed herein may be contoured for reception within alternative shapes wherein the corresponding rotary component (plug) is caused to rotate about a central axis relative to an inner surface of a corresponding valve body. For example, each of the seal assemblies disclosed herein may be adapted for use with a conically shaped rotary component and a conically shaped inner surface of the corresponding valve body or for a ball valve configuration including a spherically shaped rotary component and a spherically shaped inner surface of the corresponding valve body, as desired.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

From the foregoing description, one ordinarily skilled in the art can easily ascertain the essential characteristics of this present disclosure and, without departing from the spirit and scope thereof, can make various changes and modifications to the present disclosure to adapt it to various usages and conditions.

What is claimed is:

1. A sealing assembly for a rotary valve having a rotary component configured to rotate relative to a valve body, the sealing assembly comprising:
   a first sealing structure configured to sealingly engage the rotary component, the first sealing structure including an outwardly extending support feature, wherein the first sealing structure is formed from a substantially rigid material; and
   a second sealing structure configured to sealingly engage the first sealing structure and the valve body, the second sealing structure disposed adjacent the outwardly extending support feature of the first sealing structure, wherein the second sealing structure is formed from a resiliently deformable material, wherein the second sealing structure is compressed radially between the outwardly extending support feature of the first sealing structure and the valve body.

2. The sealing assembly of claim 1, wherein the substantially rigid material is a thermoplastic material.

3. The sealing assembly of claim 2, wherein the thermoplastic material is one of polyphthalamide or polyphenylene sulfide.

4. The sealing assembly of claim 1, wherein the resiliently deformable material is an elastomeric material.

5. The sealing assembly of claim 4, wherein the elastomeric material is one of Santoprene® thermoplastic elastomer, ethylene propylene diene monomer (EPDM) rubber, Nylabond® thermoplastic elastomer, EPDM foam, silicone rubber, nitrile, or urethane.

6. The sealing assembly of claim 1, wherein the substantially rigid material includes a lower co-efficient of friction than the resiliently deformable material.

7. The sealing assembly of claim 1, wherein the second sealing structure includes an indentation formed therein configured to receive the first sealing structure, wherein a portion of the first sealing structure configured to sealingly engage the rotary component is disposed outside of the indentation.

8. The sealing assembly of claim 1, wherein the second sealing structure includes at least two sealing lips configured to sealingly engage the valve body, wherein each of the at least two sealing lips extends peripherally around a flow opening formed through the second sealing structure.

9. The sealing assembly of claim 8, wherein the outwardly extending support feature extends into the flow opening formed through the second sealing structure.

10. A rotary valve comprising:
a valve body including an opening formed therein;
a rotary component received within the opening of the valve body, the rotary component configured to rotate relative to the valve body about an axis of rotation thereof;
a first sealing structure configured to sealingly engage the rotary component, the first sealing structure including an outwardly extending support feature, wherein the first sealing structure is formed from a substantially rigid material; and
a second sealing structure configured to sealingly engage the first sealing structure and the valve body, the second sealing structure disposed adjacent the outwardly extending support feature of the first sealing structure, wherein the second sealing structure is formed from a resiliently deformable material, wherein the second sealing structure is compressed radially between the outwardly extending support feature of the first sealing structure and the valve body.

11. The rotary valve of claim 10, wherein the second sealing structure is configured to sealingly engage an inner circumferential surface of the valve body partially defining the opening therein, and wherein the first sealing structure is configured to sealingly engage an outer circumferential surface of the rotary component.

12. The rotary valve of claim 10, the second sealing structure is configured to sealingly engage an outer circumferential surface of the outwardly extending support feature of the first sealing structure.

13. The rotary valve of claim 10, wherein the second sealing structure is configured to sealingly engage a radial outer surface of a peripheral portion of the first sealing structure.

14. The rotary valve of claim 10, wherein the first sealing structure includes a first flow opening formed therethrough and the second sealing structure includes a second flow opening formed therethrough, wherein the first flow opening and the second flow opening cooperate to provide fluid communication between a passageway formed through the rotary component and a fluid port formed through the valve body.

15. The rotary valve of claim 10, wherein the substantially rigid material is a thermoplastic material and the resiliently deformable material is an elastomeric material.

16. The rotary valve of claim 15, wherein the thermoplastic material is one of polyphthalamide or polyphenylene sulfide and the elastomeric material is one of Santoprene® thermoplastic elastomer, ethylene propylene diene monomer (EPDM) rubber, Nylabond® thermoplastic elastomer, EPDM foam, silicone rubber, nitrile, or urethane.

17. The rotary valve of claim 10, wherein the support feature of the first sealing structure has a radial thickness of 1 mm or less and/or an axial thickness of 5 mm or less.

18. The rotary valve of claim 10, wherein the first sealing structure includes a tapered piloting feature configured to aid in installing the rotary component into the opening of the valve body.

19. The rotary valve of claim 18, wherein the first sealing structure includes a retention feature formed opposite the piloting feature thereof, and wherein the retention feature is configured to be received within a retention indentation formed in the valve body.

20. The rotary valve of claim 10, wherein the second sealing structure applies a spring force to the first sealing structure in a direction towards the rotary component.

\* \* \* \* \*